June 23, 1931. A. CARTON 1,811,112
MUD GUARD FOR AUTOMOBILES
Filed April 5, 1930
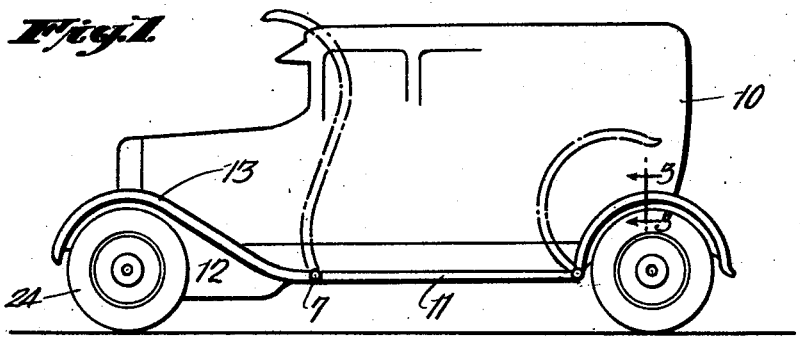
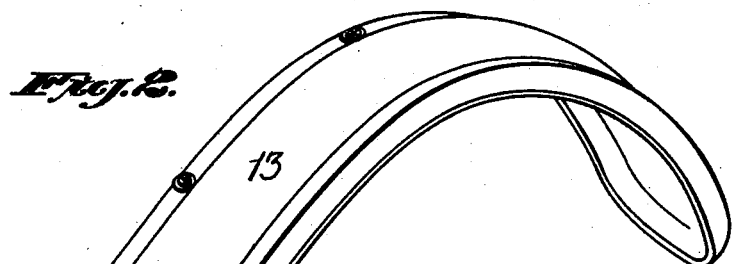
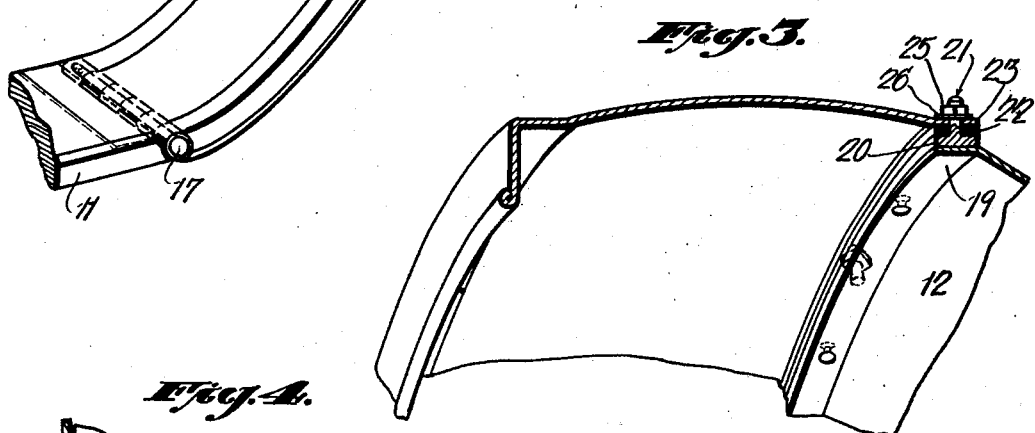
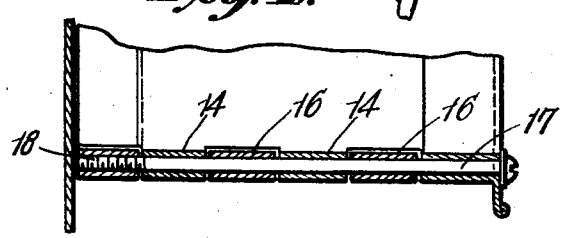
Inventor
AIME CARTON.
By *Clarence A. O'Brien*
Attorney Patented June 23, 1931

1,811,112

UNITED STATES PATENT OFFICE

AIMÉ CARTON, OF WOODCLIFFE, NEW JERSEY

MUD GUARD FOR AUTOMOBILES

Application filed April 5, 1930. Serial No. 441,896.

The invention relates to improvements in mud guards for automobiles.

The primary object of the invention resides in a mud guard which may be swung to a raised position away from the wheel, or removed at will to permit access to the underside thereof, or to parts such as the brake band and brake drum not easily reached by the present construction. My invention also facilitates the quick adjustment of the brakes and repair of adjacent parts which are now only accessible by reaching beneath the machine.

Another object of the invention is to provide a mud guard which is hingedly connected to the running board of an automobile to allow the mud guard to be swung clear of the wheel, and means for securely fastening the mud guard in a normal protecting position over the wheel so as to avoid any possible rattling of the same during the movement of the machine.

A further object is the provision of a mud guard of the kind mentioned which is simple of construction, and strong and practicable when in use.

With these and other objects in view, the invention resides in the certain novel construction, combination and arrangement of parts, the essential features of which are hereinafter fully described, are particularly pointed out in the appended claim and are illustrated in the accompanying drawings, in which:

Figure 1 is a side elevational view of an automobile equipped with my improved mud guard.

Figure 2 is a fragmentary perspective view of a running board to which the mud guard is shown hingedly connected.

Figure 3 is a vertical transverse sectional view through the mud guard.

Figure 4 is a vertical transverse sectional view on the line 4—4 of Figure 2.

Referring to the drawings by reference characters, the numeral 10 designates an automobile which is equipped with the usual running board 11, and guard apron 12 which extends outwardly and upwardly from the chassis of the vehicle.

Ordinarily, the front mud guard on each side of the vehicle constitutes an integral part of the guard apron, but in this instance the front mud guard 13 is separable therefrom for a reason to be presently explained. The inner end of the mud guard 13 terminates in spaced alined hinged knuckles 14 provided with bores therein, while fixedly attached to the running board 11 is an attaching plate or bracket 15 provided with spaced alined hinge knuckles 16, the knuckles 16 adapted to interfit with the knuckles 14 so that the bores in the respective knuckles are in axial alinement to facilitate the insertion and reception of a bolt 17, the inner threaded end 18 of which threadedly connects with the innermost knuckles 16 whereby the mud guard 13 is hingedly connected to the front end of the running board. As previously mentioned the mud guard 13 is separate from the guard apron 12 whereupon loosening of the pivot bolt 17 will permit the guard to be swung to either a protecting position shown in full lines in Figure 1 or to a raised or out of the way position as shown in dot and dash lines in the same figure.

The outer free edge of the apron 12 is provided with a flange 19 to which is welded, riveted or otherwise secured a metal reinforcing band 20, from which rise spaced threaded studs 21. Fitting over the studs 21 and resting upon the metal reinforcing band 20 is a rubber cushion strip or gasket 22 which serves as a resilient seat for the overlapping inner edge 23 of the mud guard 13. The mud guard 13 is provided with spaced openings which receive the threaded studs 21 when the mud guard is in a lowered protecting position with respect to the front wheels of the vehicle. Nuts 25 are attached to the threaded ends of the studs 21 while resilient washers 26 are provided between the inner faces of the nuts and the adjacent surface of the mud guard to prevent marring of the mud guard when the nuts are screwed to a tightened position. When the mud guard is securely fastened to the apron 12 in the manner just described, it will be seen that a firm and tight joint is provided so as to avoid any possible rattle between the parts which might be caused by the loosening of the joints. However, when it is desired to swing the mud guard 13 to a raised or out of the way position, the nuts 25 are all removed and the pivot bolt 17 loosened and in some instances it may be desired to remove the mud guard from the running board at which time the bolt 17 may be removed from engagement with the registering knuckles 14 and 16. When the principle is applied to the rear mud guard on certain makes of cars, it may be necessary to remove the mud guard to gain access to the desired parts, as the rear mud guards are usually built within the body which would prevent swinging movement.

From the foregoing description it will be seen that I have provided a novel construction of mud guard which facilitates lifting of the same to clean the under side thereof which is not easily accessible when the mud guard is in a protecting position, and furthermore it may be necessary to repair certain parts which are not easily accessible due to the mud guard, such parts being the brake drum, brake band, and steering mechanism. It is believed that this type of mud guard will facilitate the quick repair and cleaning of those parts of the car which are not accessible without reaching beneath the car on the types of vehicles now in use.

While I have shown and described what I deem to be the most desirable embodiment of my invention, I wish it to be understood that various changes in construction may be resorted to if desired, and I do not limit myself to anything less than the whole of my invention as set forth in the appended claim.

Having thus described the invention, what I claim as new and desire to secure by Letters Patent is:—

In an automobile having a running board, a wheel, and a guard apron terminating adjacent said wheel, a mud guard having one end hinged to said running board, means for removably securing said mud guard to said guard apron, said means including spaced threaded studs extending outward from said guard apron along the length thereof for the passage through openings provided in said mud guard, and securing nuts threaded to the outer ends of said studs.

In testimony whereof I affix my signature.

AIMÉ CARTON.